United States Patent
Vasekin et al.

(10) Patent No.: US 11,409,532 B1
(45) Date of Patent: Aug. 9, 2022

(54) SELECTING INSTRUCTIONS FOR A VALUE PREDICTOR

(71) Applicant: Arm Limited, Cambridge (GB)

(72) Inventors: Vladimir Vasekin, Cambridge (GB); David Michael Bull, Cambridge (GB); Sanghyun Park, Cambridge (GB); Alexei Fedorov, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/215,429

(22) Filed: Mar. 29, 2021

(51) Int. Cl.
 *G06F 9/30* (2018.01)
 *G06F 9/38* (2018.01)
 *G06F 9/50* (2006.01)
 *G06F 9/32* (2018.01)

(52) U.S. Cl.
 CPC ........ *G06F 9/3832* (2013.01); *G06F 9/30079* (2013.01); *G06F 9/30145* (2013.01); *G06F 9/321* (2013.01); *G06F 9/3844* (2013.01); *G06F 9/3867* (2013.01); *G06F 9/5011* (2013.01)

(58) Field of Classification Search
 CPC .................................................. G06F 9/3832
 See application file for complete search history.

(56) References Cited

U.S. PATENT DOCUMENTS

2020/0356372 A1* 11/2020 Al Sheikh ............. G06F 9/3802

OTHER PUBLICATIONS

Calder et al.; Selective Value Prediction; 1999, IEEE (Year: 1999).*
Bandishte et al.; Focused Value Prediction; 2020, IEEE (Year: 2020).*

* cited by examiner

*Primary Examiner* — Corey S Faherty
(74) *Attorney, Agent, or Firm* — Nixon & Vanderhye P.C.

(57) ABSTRACT

Apparatuses and methods of data processing are disclosed for processing circuitry having a pipeline of multiple stages. Value prediction storage circuitry holds value predictions, each associated with an instruction identifier. The value prediction storage circuitry performs look-ups and provides the processing circuitry with data value predictions. The processing circuitry speculatively issues a subsequent instruction into the pipeline by provisionally assuming that execution of a primary instruction will result in the generated data value prediction. Allocation of entries into the value prediction storage circuitry is based on a dynamic allocation policy, whereby likelihood of allocation into the value prediction storage circuitry of an data value prediction increases for an executed instruction when the executed instruction is associated with at least one empty processing stage in the pipeline.

14 Claims, 5 Drawing Sheets

SELECTING INSTRUCTIONS FOR A VALUE PREDICTOR

TECHNICAL FIELD

The present disclosure relates to data processing. In particular, the present disclosure relates to a data processing apparatus which comprises a value predictor.

DESCRIPTION

A data processing apparatus which executes instructions may be provided with a value predictor which provides a prediction for a value which will result when a certain instruction is executed. This can be of particular benefit in the context of execution of an instruction which has a long completion latency, when other instructions are dependent on the outcome of the execution of that instruction. For example, a load instruction which retrieves a data value from a storage location in memory may be "in flight" for many processing cycles. Another instruction which follows the load instruction and makes use of that data value as a source operand will therefore be held up until the load operation completes. A value predictor enables the data processing apparatus to progress the execution of such dependent instructions, working on the assumption that a predicted value will be correct. The penalty of correcting occasional errors in the predictions (by re-running instruction execution from the point at which the incorrect predicted value was used) can be outweighed by the performance benefit of avoiding the above-mentioned hold ups for dependent instructions. Nevertheless the storage capacity of such a value predictor is finite and therefore judicious selection of its content is required.

SUMMARY

In one example described herein there is an apparatus comprising:

processing circuitry configured to perform data processing operations in response to instructions, wherein the processing circuitry is arranged as a pipeline of multiple stages;

value prediction storage circuitry configured to store a plurality of data value predictions, wherein each data value prediction is associated with an instruction identifier indicative of a corresponding instruction and wherein each data value prediction is based on a previous data value which resulted from execution of the corresponding instruction, wherein the value prediction storage circuitry is responsive to a received instruction identifier indicative of a first instruction to perform a look-up and in response to finding a matching stored instruction identifier to provide the processing circuitry with a generated data value prediction, and the processing circuitry is responsive to the generated data value prediction to speculatively issue at least one subsequent instruction which is dependent on the first instruction into the pipeline of multiple stages by provisionally assuming that execution of the primary instruction will result in the generated data value prediction; and allocation control circuitry configured to allocate entries in the value prediction storage circuitry based on selected executed instructions at a final stage of the pipeline of multiple stages and a dynamic allocation policy, wherein a selected executed instruction has created at least one interlock for another instruction, and wherein the dynamic allocation policy is defined such that a likelihood of allocation into the value prediction storage circuitry of an data value prediction increases for the selected executed instruction when the selected executed instruction is associated with at least one empty stage in the pipeline of multiple stages due to the at least one interlock.

In one example described herein there is a method of data processing comprising:

performing data processing operations in response to instructions, wherein the data processing operations are performed in a pipeline of multiple stages;

storing in value prediction storage circuitry a plurality of data value predictions, wherein each data value prediction is associated with an instruction identifier indicative of a corresponding instruction and wherein each data value prediction is based on a previous data value which resulted from execution of the corresponding instruction;

in response to a received instruction identifier indicative of a first instruction, performing a look-up in the value prediction storage circuitry and in response to finding a matching stored instruction identifier to providing a generated data value prediction;

in response to the generated data value prediction, speculatively issuing at least one subsequent instruction which is dependent on the first instruction into the pipeline of multiple stages by provisionally assuming that execution of the primary instruction will result in the generated data value prediction; and allocating entries in the value prediction storage circuitry based on selected executed instructions at a final stage of the pipeline of multiple stages and a dynamic allocation policy, wherein a selected executed instruction has created at least one interlock for another instruction, and wherein the dynamic allocation policy is defined such that a likelihood of allocation into the value prediction storage circuitry of an data value prediction increases for the selected executed instruction when the selected executed instruction is associated with at least one empty stage in the pipeline of multiple stages due to the at least one interlock.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
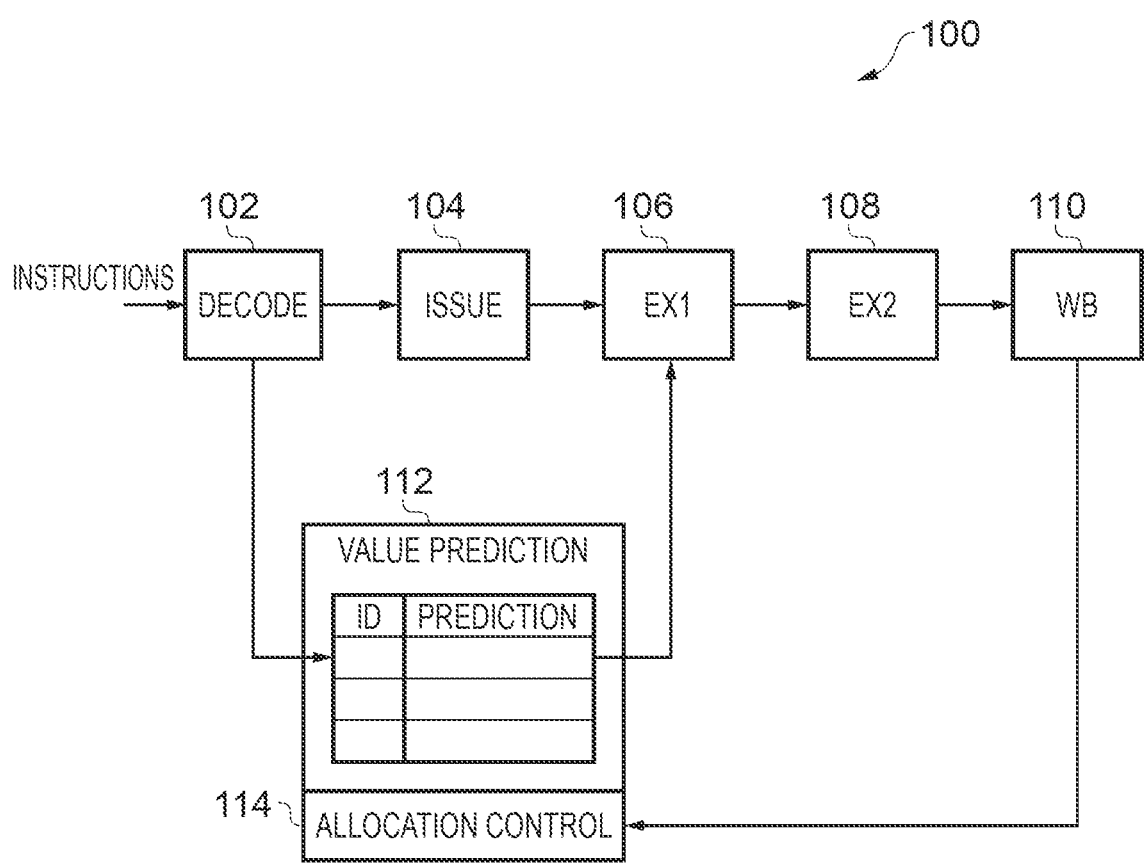
FIG. 1 schematically illustrates a data processing apparatus.

Before discussing the embodiments with reference to the accompanying figures, the following description of embodiments is provided.

In accordance with one example configuration there is provided an apparatus comprising:

processing circuitry configured to perform data processing operations in response to instructions, wherein the processing circuitry is arranged as a pipeline of multiple stages;

value prediction storage circuitry configured to store a plurality of data value predictions, wherein each data value prediction is associated with an instruction identifier indicative of a corresponding instruction and wherein each data value prediction is based on a previous data value which resulted from execution of the corresponding instruction, wherein the value prediction storage circuitry is responsive to a received instruction identifier indicative of a first instruction to perform a look-up and in response to finding a matching stored instruction identifier to provide the processing circuitry with a generated data value prediction, and the processing circuitry is responsive to the generated data value prediction to speculatively issue at least one subsequent instruction which is dependent on the first instruction into the pipeline of multiple stages by provisionally assuming that execution of the primary instruction will result in the generated data value prediction; and allocation control circuitry configured to allocate entries in the value prediction storage circuitry based on selected executed instructions at a final stage of the pipeline of multiple stages and a dynamic allocation policy, wherein a selected executed instruction has created at least one interlock for another instruction, and wherein the dynamic allocation policy is defined such that a likelihood of allocation into the value prediction storage circuitry of an data value prediction increases for the selected executed instruction when the selected executed instruction is associated with at least one empty stage in the pipeline of multiple stages due to the at least one interlock.

A dependency between instructions to be executed by the processing circuitry may result in an inefficient usage of the processing pipeline. In particular where a subsequent instruction is dependent on the result of an earlier instruction, this dependency may mean that the subsequent instruction is not issued into the processing pipeline until the processing result of the earlier instruction is available. Such a dependency is referred to herein as an interlock. Depending on the configuration of the processing pipeline and the specific instructions it is required to execute, this may lead to circumstances in which interlocks created by earlier instructions can result in no instruction being issued into the processing pipeline at a given processing cycle, meaning that an empty stage of processing (a "bubble") then passes through the pipeline. The data processing apparatus achieves greatest instruction throughput when the multiple stages of its processing pipeline are continually full and thus such bubbles represent inefficient operation. In some circumstances multiple bubbles may be present in the processing pipeline at a given time, representing particularly inefficient pipeline usage. In this context the present techniques have identified instructions which have created an interlock for another instruction as useful candidates to have their result values stored in the value prediction storage circuitry. Moreover, a dynamic allocation policy for the value prediction storage circuitry is proposed according to which the likelihood of allocation into the value prediction storage circuitry increases for values resulting from such interlock-generating instructions. In consequence this then increases the likelihood that the value prediction storage circuitry will be able to generate a value prediction for such an interlock-generating instruction when it is encountered again, and thus that at least one other instruction which is the subject of the interlock can be issued earlier into the processing pipeline and reducing the likelihood of such bubbles. The efficiency of the usage of the data processing pipeline may thereby be increased.

The dynamic allocation policy may be variously defined. In some examples the dynamic allocation policy is defined such that the likelihood of allocation into the value prediction storage circuitry of the data value prediction for the selected executed instruction is dependent on a number of interlocks the selected executed instruction has created. Where the existence of an interlock is a possible cause for the creation of a pipeline bubble, the greater the number of interlocks associated with a given instruction may be indicative of a greater probability of one or more pipeline bubbles following that instruction through the processing pipeline. Accordingly by defining the dynamic allocation policy such that the likelihood of allocation depends on the number of interlocks associated with a given instruction it can be arranged that those instructions which are most likely to be followed by pipeline bubbles to have their result values are allocated into the value prediction storage circuitry. In turn this means that the likelihood of such pipeline bubbles being created is reduced.

The content of the value prediction storage circuitry will be representative of the recent data processing activity of the processing circuitry and, when the entries which are stored therein are well selected, the content of the value prediction circuitry can support the future data processing activity of the processing circuitry by the provision of required value predictions. Accordingly there can be benefit to holding on to existing content. Conversely, when an executed instruction is associated with empty stages in the pipeline of multiple stages it can also be desirable to create an entry in the value prediction storage circuitry for the result of this executed instruction, in order to seek to avoid such empty stages for future instances of this instruction. The present techniques address the balancing of these demands with the provision of configurations of the apparatus, wherein the dynamic allocation policy is defined such that allocation into the value prediction storage circuitry of an data value prediction is further dependent on an occupancy level of the value prediction storage circuitry, and wherein the allocation control circuitry is configured to modify the dynamic allocation policy as the occupancy level of the value prediction storage circuitry increases, such that for the data value prediction to be allocated into the value prediction circuitry the selected executed instruction must be associated with more empty stages in the pipeline of multiple stages.

Thus the dynamic allocation policy may be arranged as a sliding scale, wherein the greater the occupancy level of the value prediction storage circuitry the greater the number of empty stages in the pipeline which must be associated with a given executed instruction for an entry corresponding to that executed instruction to be allocated into the value prediction storage circuitry. Alternatively expressed the greater the number of empty stages in the pipeline which are associated with a given executed instruction the higher the threshold occupancy level of the value prediction storage circuitry which is required to prevent allocation of an entry corresponding to that executed instruction into the value prediction storage circuitry.

The dynamic allocation policy may have limits which are variously defined, but in some examples the dynamic allocation policy is defined such that, when the occupancy level of the value prediction storage circuitry is at a minimum, for the data value prediction to be allocated into the value prediction circuitry it is sufficient for the selected executed instruction to be associated with a single empty stage in the pipeline of multiple stages. Equally, in some examples the dynamic allocation policy is defined such that, when the occupancy level of the value prediction storage circuitry is at a maximum, for the data value prediction to be allocated into the value prediction circuitry it is required that the selected executed instruction to be associated with a maximum possible number of empty stages in the pipeline of multiple stages.

More than one pipeline may be provided for performing data processing operations in response to the instructions and such a multiplicity of pipelines may be made use of in order to support deciding whether to allocate the entries in the value prediction storage circuitry based a comparison of processing by the first pipeline and the second pipeline. Thus in some examples the pipeline of multiple stages is a first pipeline of multiple stages and the processing circuitry comprises a second pipeline of multiple stages, wherein the second pipeline of multiple stages is configured to perform the data processing operations in response to the instructions in parallel with the first pipeline of multiple stages, wherein the generated data value prediction is provided by the value prediction storage circuitry to the first pipeline of multiple stages, wherein the second pipeline of multiple stages is arranged to perform the data processing operations without the generated data value predictions, and wherein the allocation control circuitry is configured to allocate the entries in the value prediction storage circuitry based a comparison of processing by the first pipeline and the second pipeline.

The comparison of the first pipeline and the second pipeline can provide an indication of the usefulness of the generated value predictions, i.e. where the first pipeline operates making use of these predictions whereas the second pipeline operates without them. Assuming that there are no other significant operating differences between the two pipelines, then a difference in their processing, in particular in the number of empty stages which may be associated with a given executed instruction, can provide an indication of the relative benefit of a generated value prediction for that executed instruction.

In some examples, the dynamic allocation policy is defined such that the likelihood of allocation into the value prediction storage circuitry of the data value prediction for the selected executed instruction is dependent on a presence of larger number of empty stages in the second pipeline of multiple stages than in the first pipeline of multiple stages. In some examples the likelihood of allocation into the value prediction storage circuitry of the data value prediction for the selected executed instruction increases the greater a difference in the number of empty stages in the second pipeline of multiple stages to the number of empty stages in the first pipeline of multiple stages.

The value prediction storage circuitry may be arranged to generate the generated data value prediction in a variety of ways. For example, where a given instruction is observed to repeatedly result in the same output value, this output value can be provided as the generated data value prediction. However some element of calculation may also be supported, for example where a given instruction is observed to result in an output value which regularly increases by an increment. Thus in some examples the value prediction storage circuitry is configured to store a increment step in association with at least some data value predictions, wherein for a data value prediction with a stored increment step the generated data value prediction comprises the previous data value incremented by the increment step.

The value prediction storage circuitry may further be arranged to monitor the usage of its entries and the dynamic allocation policy may then factor in such usage. This usage monitoring may for example comprise determining whether a generated data value prediction turned out to be correct or not. In some examples the value prediction storage circuitry is configured to store a confidence value in association with at least some data value predictions, and to increment the confidence value when the generated data value prediction is confirmed as correct. The confidence value may be stored in a variety of ways, but in some examples the confidence value is stored as a saturating counter value.

In some examples the dynamic allocation policy is dependent on the confidence values stored in association with the at least some data value predictions. The dynamic allocation policy may for example preferentially select entries with lower confidence values for eviction.

The value prediction storage circuitry may also monitor how recently an entry has been used, such that out-of-date entries may be discarded in order to make space for new entries. Thus in some examples the value prediction storage circuitry is configured to store a non-usage value in association with at least some data value predictions, and to increment the non-usage value when the generated data value prediction is not generated for the corresponding data value prediction, and wherein the value prediction storage circuitry is responsive to the non-usage value reaching a threshold value to clear the corresponding data value prediction.

In accordance with one example configuration there is provided a method of data processing comprising:

performing data processing operations in response to instructions, wherein the data processing operations are performed in a pipeline of multiple stages;

storing in value prediction storage circuitry a plurality of data value predictions, wherein each data value prediction is associated with an instruction identifier indicative of a corresponding instruction and wherein each data value prediction is based on a previous data value which resulted from execution of the corresponding instruction;

in response to a received instruction identifier indicative of a first instruction, performing a look-up in the value prediction storage circuitry and in response to finding a matching stored instruction identifier to providing a generated data value prediction;

in response to the generated data value prediction, speculatively issuing at least one subsequent instruction which is dependent on the first instruction into the pipeline of multiple stages by provisionally assuming that execution of the primary instruction will result in the generated data value prediction; and allocating entries in the value prediction storage circuitry based on selected executed instructions at a final stage of the pipeline of multiple stages and a dynamic allocation policy, wherein a selected executed instruction has created at least one interlock for another instruction, and wherein the dynamic allocation policy is defined such that a likelihood of allocation into the value prediction storage circuitry of an data value prediction increases for the selected executed instruction when the selected executed instruction is associated with at least one empty stage in the pipeline of multiple stages due to the at least one interlock.

Particular embodiments will now be described with reference to the figures.

FIG. 1 illustrates a data processing apparatus 100. The apparatus comprises a data processing pipeline, the general structure of which one of ordinary skill in the art will know well. This pipeline is only illustrated here at a simplified conceptual level in order to communicate the essential characteristics of the present techniques. Generally the pipeline can be seen to comprise a decode stage 102, an issue stage 104, a first execution stage 106, a second execution stage 108, and a final write-back stage 110. The data processing pipeline is arrange to execute a sequence of instructions defined by program code which are generally retrieved from memory (via fetch mechanisms which are not explicitly illustrated). The instructions are decoded in the decode stage 102 and then passed to the issue stage 104. In some examples the processor pipeline may comprise further processing stages, such as a reorder buffer (ROB) stage following the decode stage 102 and preceding the issue stage 104. Nevertheless the general principle shown is that once decoded instructions can then be issued for execution by the issue stage 104 and the actual data processing operations specified by those instructions are carried out in the execution stages 106 and 108. The execution of the instruction being complete, the final write-back stage 110 is arranged to commit the result of that data processing, for example by writing a value into one of the registers (not shown in FIG. 1) of the data processing apparatus.

The data processing apparatus 100 shown in FIG. 1 is further illustrated to comprise value prediction circuitry 112. The present techniques are concerned with addressing an issue which may arise when instructions are dependent on one another. For example, a result value generated by the execution of the first instruction may provide a source operand for another instruction, meaning that execution of that later instruction cannot begin until the result of the earlier instruction is available. If the situation arises that the later instruction follows the earlier instruction in close succession passing into the processing pipeline, this may lead to a hold up, whereby the later instruction cannot progress through the data processing pipeline until the earlier instruction has completed execution. In this context the value prediction circuitry 112 is provided and essentially comprises entries which associate instruction identifiers and data value predictions. Reference to this structure then enables the data processing apparatus to potentially provide the later instruction with a prediction of the data value which will result from the execution of the earlier instruction and on this basis execution of this later instruction can begin earlier. Of course this must assume that the data value prediction is correct and there is the potential for an erroneous prediction to be made, however it has been found that when the value prediction circuitry is well used, such instances may be relatively rare and the cost of replaying instruction execution in order to correct for such errors is outweighed by the processing efficiency gains which may be achieved. Specifically, by making use of these value predictions, at least some pipeline bubbles may be avoided, which would otherwise result from delaying the issuance of later dependent instructions into the data processing pipeline.

Generally the value prediction circuitry 112 operates as schematically illustrated in FIG. 1, namely that an indication of a current instruction is received from the decode stage 102 and a look-up is performed in the storage structure of the value prediction circuitry 112. This identifier may take a variety of forms, but for example may be a program counter value thus identifying a specific instruction at a specific point in program execution. This provides a good candidate for an instruction which may (under certain circumstances) result in the same data value being generated at each iteration. Nevertheless further variations (to be discussed further with reference to FIG. 3 below) may adapt a value prediction at each iteration, for example by incrementing the data value prediction according to an observed pattern. A data value prediction generated when there is a hit in the value prediction circuitry is passed to the execution stage(s) of the execution pipeline, making the predicted data value available to any dependent instruction(s). The value prediction circuitry 112 is further shown to comprise allocation control circuitry 114, which determines when a new entry is to be allocated into the storage structure of the value prediction circuitry 112 (which generally operates in a cache-like manner). According to the present techniques, the allocation control circuitry 114 receives information from the write-back stage 110, which information is made use of in a dynamic allocation policy administered by the allocation control circuitry. As will be discussed in more detail below, the dynamic allocation policy can have various configurations, but generally is arranged such that the likelihood of allocation into the value prediction storage circuitry 112 increases for a data value prediction which results from an instruction which reaches the write-back stage 110 and is associated with at least one empty stage in the pipeline due to an interlock (dependency) which it has created with a respect to a subsequent instruction.

Figure 2A:
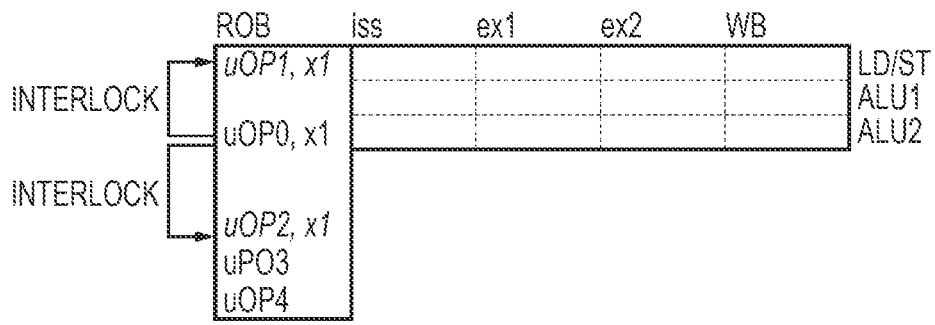
FIGS. 2A-2E schematically illustrate an example processing pipeline and the progress of example micro-ops through it.
Figure 2B:
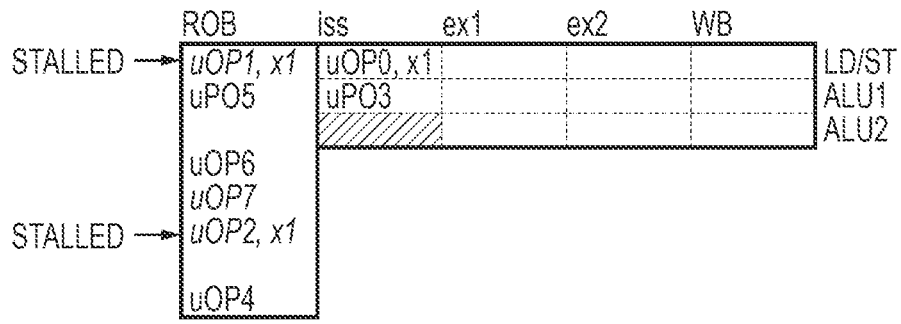
Figure 2C:
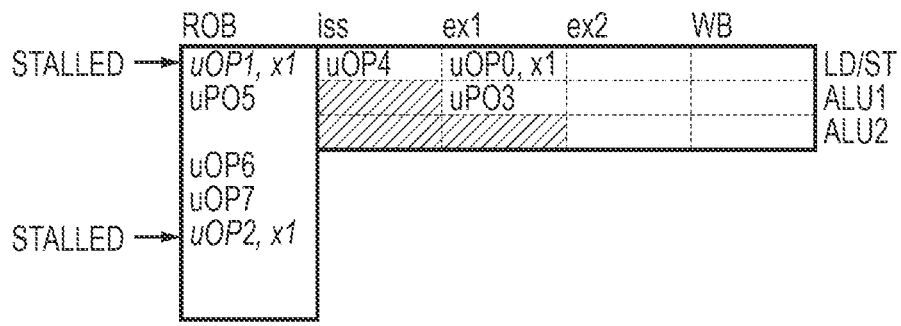
Figure 2D:
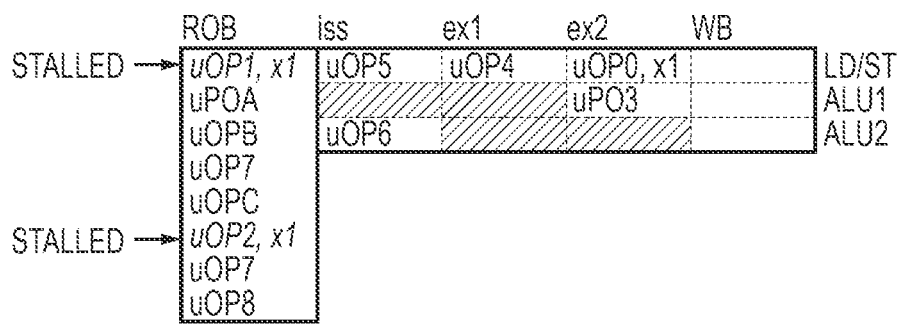
Figure 2E:
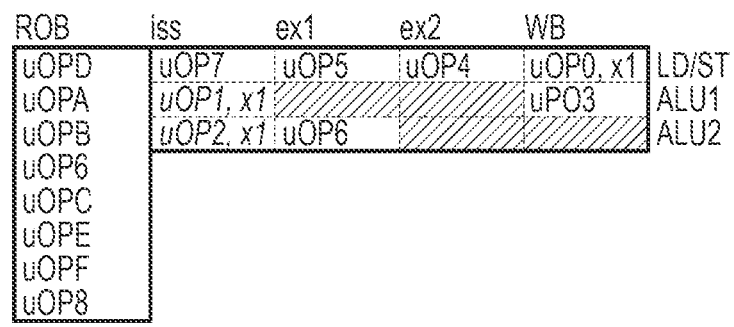

FIGS. 2A-2E illustrate a data processing pipeline and the progress of a set of micro-ops through the data processing pipeline illustrating the context in which the present techniques are used. Note that the example of FIGS. 2A-2E is with respect to the progress of micro-ops through the data processing pipeline and accordingly it should be understood that the operation of a decoding stage of the data processing apparatus may therefore result in one or more micro-ops, where a micro-op is then to be considered that which passes through the data processing pipeline. Accordingly references to "an instruction" herein with respect to the data processing pipeline should be interpreted to comprise a micro-op. The specific data processing pipeline schematically illustrated in FIGS. 2A-2E is an in-order dual issue pipeline, although the present techniques are not limited to any particular pipeline configuration other than that it is susceptible to pipeline bubbles being caused by interlocks being present between the instructions (micro-ops) which it processes. The processing pipeline of FIGS. 2A-2E is illustrated as beginning at a re-order buffer (ROB) stage, which in the example shown is configured to hold up to eight pending micro-ops. In the example of FIG. 2A, a first micro-op (uOP0) is shown to create two interlocks with respect to two further micro-ops (uOP1 and uOP2), since uOP0 is a load operation which loads a data value from memory into the register labelled as x1. The data dependency results from the fact that both the micro-ops uOP1 and uOP2 make use of this register as an input operand for their own operation. Accordingly, without a data value prediction being provided for an expected value that will be present in register x1 (as is the case in the illustration of FIGS. 2A-2E), the two micro operations uOP1 and uOP2 stall at the ROB stage until the micro-operation uOP0 has completed and the data value in register x1 is available. Thus, as shown in FIG. 2B, uOP0 progresses into the data processing pipeline firstly moving into the issue stage of the load/store (LD/ST) pipeline. In parallel uOP3 is issued into one of the two ALU pipelines, since this does not have a dependency on an earlier instruction which is holding it up. The progression of pipeline content shown by FIGS. 2A-2E illustrates that uOP0 must progress to the write-back (WB) stage of the pipeline for the dependent micro-operations uOP1 and uOP2 to enter the issue stage and make further progress through the data processing pipeline. Where uOP1 and uOP2 are to be issued into the two ALU pipelines (ALU1, ALU2), this means that as a result of these two micro-ops stalling (and as illustrated by the hatched stages of the pipeline) 'bubbles' form in the processor pipeline. These empty stages are thus created by, i.e. associated with, the micro-op uOP0. In the illustrated example of FIGS. 2A-2E it can be seen that the micro-op uOP0 is associated with four empty stages in the pipeline. However, the number of empty stages associated with the given instruction or micro-op passing through a data processing pipeline may vary depending on the configuration of the processor pipeline and the nature of the inter-dependency between the operations being performed. It can be seen that in a pipeline configured as in the examples of FIGS. 2A-2E the maximum number of bubbles which may be created is 8, i.e. where a micro-op entering the pipeline causes all other micro-ops held in the ROB stage to stall until it completes the second execution stage EX2.

In this context, the present techniques make use of information from the processing pipeline, in particular related to the instructions which reach the write-back stage WB and the number of empty stages which may be associated with them. Depending on the configuration of the data processing pipeline, a greater or lesser degree of information may be available at the write-back stage to determine such association. Indeed this association may be determined on an empirical basis, i.e. when an instruction such as uOP0 reaches the write-back stage, the working assumption may be made that any bubbles present in the pipeline have been caused as a result of that instruction.

Figure 3:
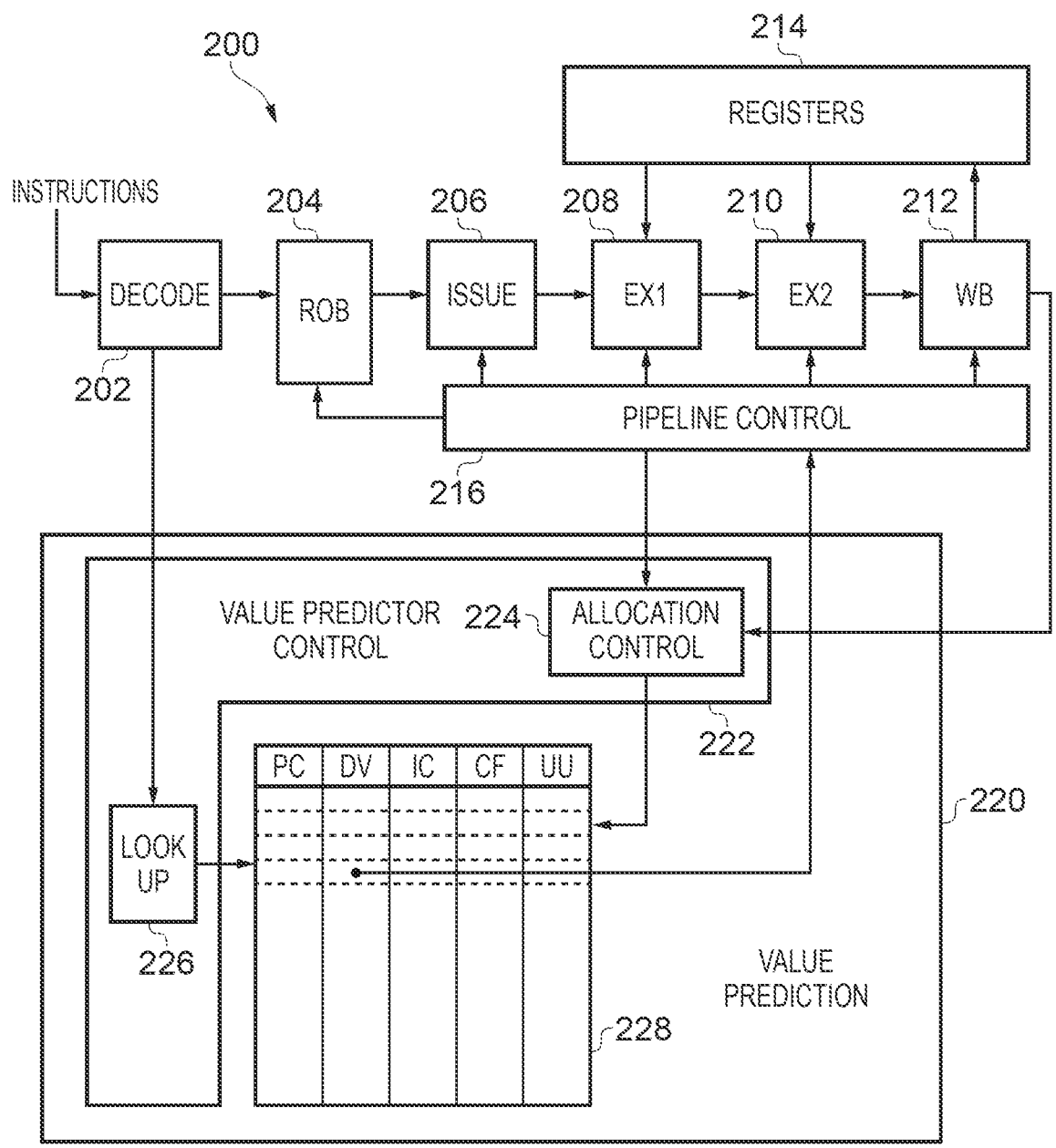
FIG. 3 schematically illustrates a data processing apparatus.

FIG. 3 schematically illustrates a data processing apparatus 200. The processing pipeline illustrated is broadly configured in the same manner as FIG. 1. Here the sequence of pipeline stages illustrated comprises decode stage 202, reorder buffer stage 204, issue stage 206, a first execution stage 208, a second execution stage 210, and a write-back stage 212. It is noted again here for completeness that that present techniques are not constrained to this particular constellation of pipeline stages. Generally, instructions are decoded by the decode stage 202 causing micro-ops to be buffered in the re-order buffer 204, from where they can enter the issue stage 206 (under the control of the pipeline control 216 once their source operands are available). Execution stages 208 and 210 may derive their source operands from the content of the registers 214 and as a result of the data processing which they carry out the final write-back stage 212 may cause data values in the registers 214 to be updated. The apparatus 200 is further shown to comprise value prediction circuitry 220. The value prediction circuitry is generally controlled by value predictor control circuitry 222 and further comprises value prediction storage 228, which is arranged to hold a number of entries. In the example of FIG. 3 the value prediction table 228 holds up to 16 entries (but the present techniques are not limited to any particular number of entries which may be stored in value prediction storage). Look-up control circuitry 226 of the value predictor control circuitry 222 receives an indication from the decode stage 202 of an instruction which has been decoded. In the example of FIG. 3 this is in the form of an indication of the program counter (PC) value associated with that instruction and entries in the value prediction table 228 are stored in association with (indications of) PC values. This could, say, be a PC value, a partial PC value, or a hash function of the PC value. The use of a hash value can reduce the storage capacity required (for example a 12 bit hash value might be used), without the risk of collisions (different PV values with the same hash value) disrupting the operation of the value prediction storage to any significant extent.

Thus the look-up circuitry 226 performs a look-up in response to reception of this PC information from the decode circuitry 202. When a hit occurs, the corresponding data value prediction (DV) is generated and passed to the pipeline control 216, which makes this value available to the appropriate pipeline stages. Thus for example referring to the example of FIGS. 2A-2E the decoding of the instruction which generated uOP0 would cause a look-up to be performed in the value prediction table 228 and, were a generated data value prediction to be found corresponding to the expected data value to result from this operation, this value prediction would be provided such that it is available to uOP1 and uOP2, enabling them to immediately follow uOP0 into the processing pipeline and some, if not all, of the bubbles associated with uOP0 shown in FIGS. 2A-2E may be avoided. In examples where the same data value is consistently seen then a fixed data value DV may be stored in association with a given program counter identifier. This could for example be a 16 or 32 bit signed value. However, the value prediction table 228 also shows an increment step (for example a signed 16-bit value), which can be applied to generate the generated data value prediction. Accordingly, when the same data value should be generated from iteration to iteration then this IC value is 0, but regular steps observed in the progression of the data value can be captured by means of this IT value such that at each iteration the generated data value prediction may be incremented. This may for example be useful in the context of a looping (i.e. repeated) section of program code in which a given instruction modifies a data value in a predictable incremental manner Additionally, the value prediction table 228 comprises a confidence value CF for each entry (which may for example be a small number of bits e.g. between 5 and 8), which is incremented to count a number of correct predictions. This accuracy of prediction is reported by the pipeline control 216 to the allocation control circuitry 224, when an instruction which is being executed on the basis of a generated data value prediction itself reaches the write-back stage 212 and the correctness of the generated data value prediction can be reported. Finally, each entry in the value prediction table 228 further comprises an unused timer value UU. For example, this may increment every 64 cycles and if the counter reaches 1000 cycles then the entry may be marked for eviction from the table.

The allocation control circuitry 224 makes use of information received from the write-back stage 212 in the administration of its dynamic allocation policy to determine whether a data value prediction entry for an instruction which has reached the write-back stage 212 should be allocated into the value prediction table 218 (assuming that it is not already there). The allocation control circuitry 224 administers a dynamic allocation policy, which is based on the number of bubbles observed in the processor pipeline when a given instruction reaches the write-back stage 212 (assuming that the instruction is known to be one that is susceptible to interlock generation, i.e. has at least one result operand which corresponds to a source operand of a subsequent instruction). The dynamic allocation policy further takes into account the number of valid entries which are currently held in the value prediction table 228. An allocation of a value prediction into the table for an instruction which reaches the write-back stage is triggered when one of the following conditions is found to be true:

NE<4 and BL>0
NE<8 and BL>1
NE<12 and BL>2
NE>12 and BL>3 where NE is the current number of valid entries in the value prediction table 228 and BL is the number of bubbles (assumed to be) created by the instruction under consideration. Accordingly, the more entries of the valid prediction table which are currently occupied, the higher the threshold which is set for allocation to occur, i.e. the likelihood of allocation decreases. Conversely, when the allocation table is more empty and when the number of bubbles it created is greater, the likelihood of allocation into the value prediction table 228 increases. This supports an approach by which the value prediction is populated by instructions where a higher performance benefit may be expected. In the example shown in FIG. 3, the dynamic allocation policy is such that when the table is empty an instruction cause allocation with only bubble in the pipeline which may be associated with it. Conversely, when the table is nearly full, instructions will only cause allocation when they have created a high number of bubbles.

Figure 4:
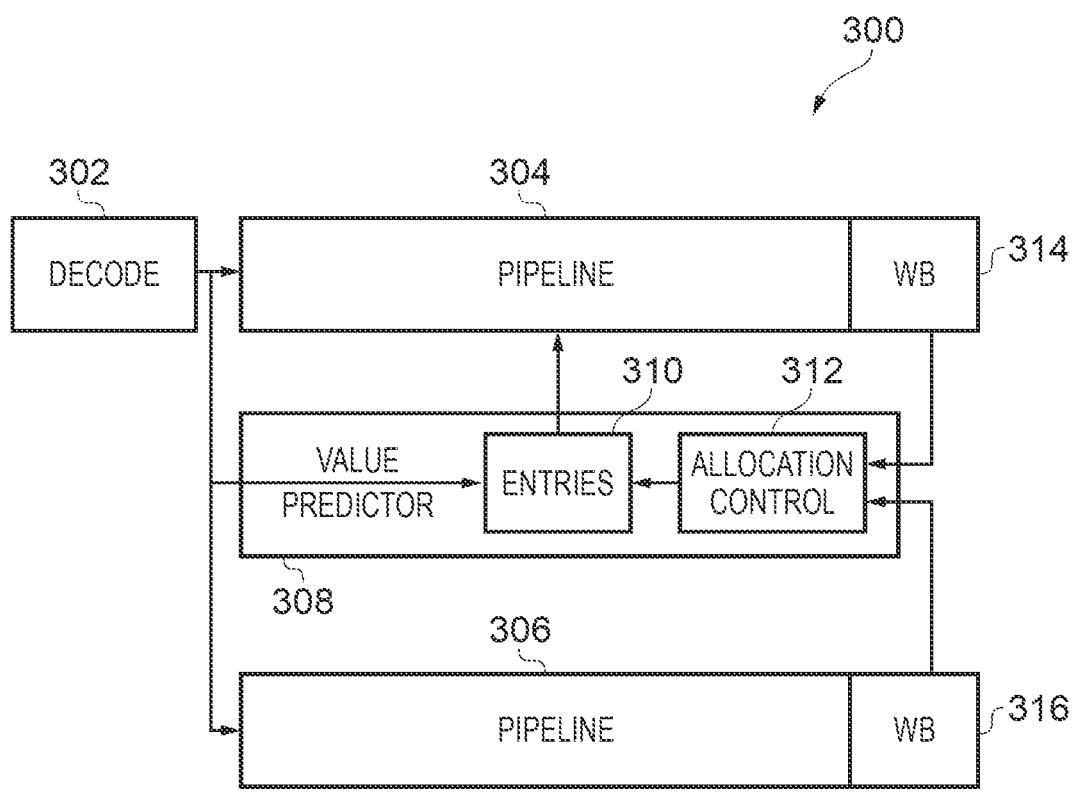
FIG. 4 schematically illustrates parallel pipelines.

FIG. 4 schematically illustrates a data processing apparatus 300. Notably the apparatus 300 comprises a decode stage 302, which is followed by two distinct pipelines 304 and 306, where it should be understood that each of these may be arranged in the manner of the sequence of pipeline stages shown in any of the preceding figures (i.e. comprising its own execution capability). The apparatus 300 is arranged such that decoded instructions pass from the decode stage 302 in parallel into the two pipelines. A value predictor 308 is also provided, which holds a number of entries 310 and the population of which is controlled by the allocation control circuitry 312. However, note in particular that the data value predictions generated by the value predictor on the basis of the entries 310 are only provided to the pipeline 304 and not to the pipeline 306. This enables a comparison to be made at the respective write-back stages 314, 316 of the two pipelines as to the effect which the provision of the data value prediction may have on the progress of instructions and in particular on the creation of bubbles in the respective pipelines. The allocation control circuitry 312 receives information from both write-back stages 314 and 316 and based on a comparison between this information from the two administers the allocation of entries into the value prediction table 310. In particular, when the number of empty stages (bubbles) in the respective pipelines differs, then (other factors notwithstanding) this difference may be associated with the provision of the data value prediction into the pipeline 304 and not into the pipeline 306. Note that such a comparison operates on the basis of an up-and-running value prediction table 310, which holds data value predictions which can then be provided to pipeline 304 (and not to the pipeline 306). The comparison thus provides a metric for the usefulness of keeping (or not) selected entries in the value prediction table 310. In parallel the allocation control circuitry 312 can administer an allocation policy in one of the forms described above, i.e. with respect to pipeline 304 alone, in order to determine which new entries should be made.

Figure 5:
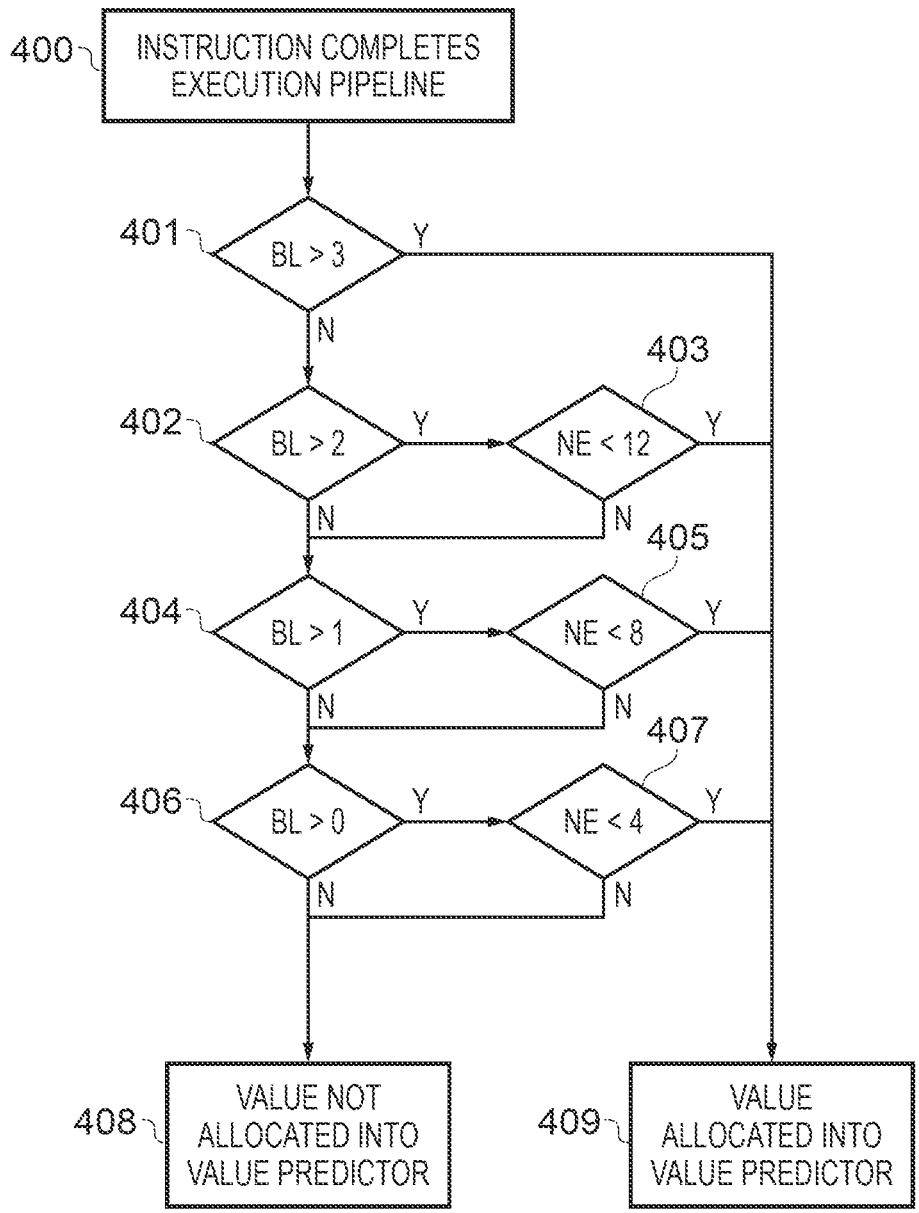
FIG. 5 is a flow diagram showing a sequence of steps which are taken in one example method when determining whether a value resulting from instruction execution should be allocated into a value predictor.

FIG. 5 shows a sequence of steps which may be taken in the administration of a dynamic allocation policy applied to value prediction storage. The flow begins at step 400 where an instruction completes its passage through an execution pipeline (i.e. it reaches its final stage of the pipeline such as one of the above-discussed write-back stages). At step 401, it is determined if the instruction is associated with more than three bubbles in the pipeline, where the subject pipeline in this example corresponds to that of FIGS. 2A-2E in that the maximum number of bubbles which may be associated with a given instruction which reaches the write-back stage is eight in the worst case scenario. If this condition is found to be true at step 401, then the flow proceeds directly to step 409 where a value prediction from this instruction is allocated into the value predictor. Otherwise the flow proceeds to step 402, where it is determined if the instruction is associated to more than two bubbles in the pipeline. This being the case, then it is required at step 403 for the current number of valid entries in the value prediction table to be less than 12. If this is the case then the flow proceeds to step 409 for the value prediction to be allocated in the value predictor. When this is not the case, the flow follows to step 404 as it also does when there are two or fewer bubbles in the pipeline. At step 404 it is determined if there is more than one bubble in the pipeline and if this is the case at step 405 it is determined if there are less than 8 valid entries in the value prediction table. This being the case the flow proceeds to step 409 for the value prediction to be allocated in the value prediction table. If this is not the case, or if there is only one bubble or less in the pipeline, then the flow proceeds to step 406. At step 406 it is determined if there is at least one bubble in the pipeline. This being the case then the flow proceeds to step 407 where it is determined if there are fewer than 4 valid entries currently present in the value prediction table. This being the case then the flow proceeds to step 409 for the value to be allocated to the value prediction table. Otherwise, and in the same manner if there are no bubbles present in the pipeline, then the flow proceeds to step 408 and for this instruction a value is not allocated into the value prediction table.

In brief overall summary apparatuses and methods of data processing are disclosed for processing circuitry having a pipeline of multiple stages. Value prediction storage circuitry holds value predictions, each associated with an instruction identifier. The value prediction storage circuitry performs look-ups and provides the processing circuitry with data value predictions. The processing circuitry speculatively issues a subsequent instruction into the pipeline by provisionally assuming that execution of a primary instruction will result in the generated data value prediction. Allocation of entries into the value prediction storage circuitry is based on a dynamic allocation policy, whereby likelihood of allocation into the value prediction storage circuitry of an data value prediction increases for an executed instruction when the executed instruction is associated with at least one empty processing stage in the pipeline.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
processing circuitry configured to perform data processing operations in response to instructions, wherein the processing circuitry is arranged as a pipeline of multiple stages;
value prediction storage circuitry configured to store a plurality of data value predictions, wherein each data value prediction is associated with an instruction identifier indicative of a corresponding instruction and wherein each data value prediction is based on a previous data value which resulted from execution of the corresponding instruction,
wherein the value prediction storage circuitry is responsive to a received instruction identifier indicative of a first instruction to perform a look-up and in response to finding a matching stored instruction identifier to provide the processing circuitry with a generated data value prediction,
and the processing circuitry is responsive to the generated data value prediction to speculatively issue at least one subsequent instruction which is dependent on the first instruction into the pipeline of multiple stages by provisionally assuming that execution of the first instruction will result in the generated data value prediction; and
allocation control circuitry configured to allocate entries in the value prediction storage circuitry based on selected executed instructions at a final stage of the pipeline of multiple stages and a dynamic allocation policy,
wherein a selected executed instruction has created at least one interlock for another instruction, and
wherein the dynamic allocation policy is defined such that a likelihood of allocation into the value prediction storage circuitry of an data value prediction increases for the selected executed instruction when the selected executed instruction is associated with at least one empty stage in the pipeline of multiple stages due to the at least one interlock.

2. The apparatus as claimed in claim 1,
wherein the dynamic allocation policy is defined such that the likelihood of allocation into the value prediction storage circuitry of the data value prediction for the selected executed instruction is dependent on a number of interlocks the selected executed instruction has created.

3. The apparatus as claimed in claim 1,
wherein the dynamic allocation policy is defined such that allocation into the value prediction storage circuitry of an data value prediction is further dependent on a an occupancy level of the value prediction storage circuitry,
and wherein the allocation control circuitry is configured to modify the dynamic allocation policy as the occupancy level of the value prediction storage circuitry increases, such that for the data value prediction to be allocated into the value prediction circuitry the selected executed instruction must be associated with more empty stages in the pipeline of multiple stages.

4. The apparatus as claimed in claim 3,
wherein the dynamic allocation policy is defined such that, when the occupancy level of the value prediction storage circuitry is at a minimum, for the data value prediction to be allocated into the value prediction circuitry it is sufficient for the selected executed instruction to be associated with a single empty stage in the pipeline of multiple stages.

5. The apparatus as claimed in claim 3,
wherein the dynamic allocation policy is defined such that, when the occupancy level of the value prediction storage circuitry is at a maximum, for the data value prediction to be allocated into the value prediction circuitry it is required that the selected executed instruction to be associated with a maximum possible number of empty stages in the pipeline of multiple stages.

6. The apparatus as claimed in claim 1,
wherein the pipeline of multiple stages is a first pipeline of multiple stages and the processing circuitry comprises a second pipeline of multiple stages, wherein the second pipeline of multiple stages is configured to perform the data processing operations in response to the instructions in parallel with the first pipeline of multiple stages,
wherein the generated data value prediction is provided by the value prediction storage circuitry to the first pipeline of multiple stages,
wherein the second pipeline of multiple stages is arranged to perform the data processing operations without the generated data value predictions,
and wherein the allocation control circuitry is configured to allocate the entries in the value prediction storage circuitry based a comparison of processing by the first pipeline and the second pipeline.

7. The apparatus as claimed in claim 6,
wherein the dynamic allocation policy is defined such that the likelihood of allocation into the value prediction storage circuitry of the data value prediction for the selected executed instruction is dependent on a presence of larger number of empty stages in the second pipeline of multiple stages than in the first pipeline of multiple stages.

8. The apparatus as claimed in claim 7,
wherein the likelihood of allocation into the value prediction storage circuitry of the data value prediction for the selected executed instruction increases the greater a difference in the number of empty stages in the second pipeline of multiple stages to the number of empty stages in the first pipeline of multiple stages.

9. The apparatus as claimed in claim 1,
wherein the value prediction storage circuitry is configured to store a increment step in association with at least some data value predictions, wherein for a data value prediction with a stored increment step the generated data value prediction comprises the previous data value incremented by the increment step.

10. The apparatus as claimed in claim 1, wherein the value prediction storage circuitry is configured to store a confidence value in association with at least some data value predictions, and to increment the confidence value when the generated data value prediction is confirmed as correct.

11. The apparatus as claimed in claim 10, wherein the confidence value is stored as a saturating counter value.

12. The apparatus as claimed in claim 10, wherein the dynamic allocation policy is dependent on the confidence values stored in association with the at least some data value predictions.

13. The apparatus as claimed in claim 1, wherein the value prediction storage circuitry is configured to store a non-usage value in association with at least some data value predictions, and to increment the non-usage value when the generated data value prediction is not generated for the corresponding data value prediction, and wherein the value prediction storage circuitry is responsive to the non-usage value reaching a threshold value to clear the corresponding data value prediction.

14. A method of data processing comprising:

performing data processing operations in response to instructions, wherein the data processing operations are performed in a pipeline of multiple stages;

storing in value prediction storage circuitry a plurality of data value predictions, wherein each data value prediction is associated with an instruction identifier indicative of a corresponding instruction and wherein each data value prediction is based on a previous data value which resulted from execution of the corresponding instruction;

in response to a received instruction identifier indicative of a first instruction, performing a look-up in the value prediction storage circuitry and in response to finding a matching stored instruction identifier to providing a generated data value prediction;

in response to the generated data value prediction, speculatively issuing at least one subsequent instruction which is dependent on the first instruction into the pipeline of multiple stages by provisionally assuming that execution of the first instruction will result in the generated data value prediction; and allocating entries in the value prediction storage circuitry based on selected executed instructions at a final stage of the pipeline of multiple stages and a dynamic allocation policy, wherein a selected executed instruction has created at least one interlock for another instruction, and wherein the dynamic allocation policy is defined such that a likelihood of allocation into the value prediction storage circuitry of an data value prediction increases for the selected executed instruction when the selected executed instruction is associated with at least one empty stage in the pipeline of multiple stages due to the at least one interlock.

\* \* \* \* \*